US011670079B1

(12) United States Patent
Bokshi-Drotar et al.

(10) Patent No.: US 11,670,079 B1
(45) Date of Patent: Jun. 6, 2023

(54) TECHNOLOGIES FOR USING IMAGE DATA ANALYSIS TO ASSESS AND CLASSIFY HAIL DAMAGE

(71) Applicant: State Farm Mutual Automobile Insurance Company, Bloomington, IL (US)

(72) Inventors: Marigona Bokshi-Drotar, McKinney, TX (US); Jing Wan, Allen, TX (US); Sandra Kane, Garland, TX (US); Yuntao Li, Champaign, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 194 days.

(21) Appl. No.: 17/199,203

(22) Filed: Mar. 11, 2021

Related U.S. Application Data

(63) Continuation of application No. 16/175,126, filed on Oct. 30, 2018, now Pat. No. 10,977,490.

(51) Int. Cl.
*G06T 7/00* (2017.01)
*G06V 20/10* (2022.01)
(Continued)

(52) U.S. Cl.
CPC ........... *G06V 20/176* (2022.01); *G06Q 40/08* (2013.01); *G06Q 50/16* (2013.01); *G06T 7/0002* (2013.01);
(Continued)

(58) Field of Classification Search
CPC ...... G06V 10/22; G06V 10/255; G06V 10/26; G06V 10/267; G06V 10/273; G06V 10/44; G06V 10/54; G06V 10/56; G06V 10/70; G06V 10/764; G06V 10/766; G06V 10/82; G06V 20/10; G06V 20/17; G06V 20/176; G06T 2207/20081; G06T 2207/20084; G06T 7/0002–0008; G06T 2207/30184; G06T 7/10–12; G06T 7/136–168; G06N 3/02–088; G06Q 40/08; G06Q 50/16; G06Q 50/163
See application file for complete search history.

(56) References Cited

U.S. PATENT DOCUMENTS

2017/0249510 A1   8/2017   Labrie et al.
2017/0270612 A1   9/2017   Howe et al.
(Continued)

OTHER PUBLICATIONS

Liu, Wei, et al. "Ssd: Single shot multibox detector." European conference on computer vision. Springer, Cham, 2016. (Year: 2016).*

(Continued)

*Primary Examiner* — Geoffrey E Summers
(74) *Attorney, Agent, or Firm* — Lee & Hayes, P.C.

(57) ABSTRACT

Systems and methods for analyzing image data to assess property damage are disclosed. According to certain aspects, a server may analyze segmented digital image data of a roof of a property using a convolutional neural network (CNN). The server may extract a set of features from a set of regions output by the CNN. Additionally, the server may analyze the set of features using an additional image model to generate a set of outputs indicative of a confidence level that actual hail damage is depicted in the set of regions.

20 Claims, 11 Drawing Sheets

(51) Int. Cl.
    *G06Q 50/16* (2012.01)
    *G06Q 40/08* (2012.01)
    *G06V 10/82* (2022.01)
    *G06V 10/56* (2022.01)
    *G06V 10/25* (2022.01)
    *G06V 10/26* (2022.01)
    *G06V 10/54* (2022.01)
    *G06V 20/17* (2022.01)

(52) U.S. Cl.
    CPC .............. *G06V 10/25* (2022.01); *G06V 10/26* (2022.01); *G06V 10/54* (2022.01); *G06V 10/56* (2022.01); *G06V 10/82* (2022.01); *G06T 2207/20084* (2013.01); *G06V 20/17* (2022.01)

(56) References Cited

U.S. PATENT DOCUMENTS

| | | |
|---|---|---|
| 2018/0247416 A1 | 8/2018 | Ruda et al. |
| 2019/0065907 A1* | 2/2019 | Strong .................. G06V 10/82 |
| 2019/0095764 A1 | 3/2019 | Li |

OTHER PUBLICATIONS

Hezaveh, Mahshad Mahdavi, Christopher Kanan, and Carl Salvaggio. "Roof damage assessment using deep learning." 2017 IEEE Applied Imagery Pattern Recognition Workshop (AIPR). IEEE, 2017. (Year: 2017).*

Wang, Fan. "Understanding High Resolution Aerial Imagery Using Computer Vision Techniques." (2017). (Year: 2017).*

Hezaveh, et al., "Roof Damage Assessment using Deep Learning", IEEE Applied Imagery Pattern Recognition Workshop (AIPR), IEEE, 2017, 6 pages.

Liu, et al., "SSD: Single Shot Multibox Detector", European conference on computer vision. Springer, Cham, 2016, pp. 21-37.

Final Office Action dated Aug. 25, 2020 for U.S. Appl. No. 16/175,126, "Technologies for Using Image Data Analysis to Assess and Classify Hail Damage", Bokshi-Drotar, 18 pages.

Non Final Office Action dated Apr. 14, 2020 for U.S. Appl. No. 16/175,126 "Technologies for Using Image Data Analysis to Assess and Classify Hail Damage" Bokshi-Drotar, 16 pages.

Simonyan, et al., "Very Deep Convolutional Networks for Large-Scale Image Recognition", ICLR 2015, arXiv: 1409.1556v6, pp. 1-14.

* cited by examiner

TECHNOLOGIES FOR USING IMAGE DATA ANALYSIS TO ASSESS AND CLASSIFY HAIL DAMAGE

PRIORITY

This application is a continuation of, and claims priority to, U.S. patent application Ser. No. 16/175,126, filed on Oct. 30, 2018, entitled "TECHNOLOGIES FOR USING IMAGE DATA ANALYSIS TO ASSESS AND CLASSIFY HAIL DAMAGE", and is fully incorporated by reference herein.

TECHNICAL FIELD

The present disclosure is directed to analyzing image data to automatically assess and classify hail damage. More particularly, the present disclosure is directed to systems and methods for analyzing digital image data that depicts a set of properties to identify and classify hail damage that may be depicted in the digital image data.

BACKGROUND

Individuals such as homeowners typically have insurance policies for their properties that provide financial reimbursement to the individuals in the event of damage or theft to the properties and/or their contents. For example, hail storms may produce hail that damages the roofs of properties. In some conventional techniques, during processing of an insurance claim, a claims specialist or roof inspector manually inspects a roof to assess damage to the roof. In other conventional techniques, image data may be manually examined by claims specialists to detect damage to properties. In particular, aerial images captured by unmanned aerial vehicles (UAVs; i.e., "drones") and/or satellites from a vantage point located above a property may be used in the image examination by claims specialists.

However, there are limitations in these conventional techniques. In particular, it is inefficient, time-consuming, and expensive to have individuals manually inspect properties for damage. Further, claims specialists encounter difficulties in examining image data to assess certain types of property damage (e.g., hail damage), especially from an entire view of a property's roof and without specific regions to target or assess.

Accordingly, there is an opportunity to incorporate technologies to analyze overhead image data to automatically assess and classify property damage, such as hail damage.

BRIEF SUMMARY

In one embodiment, a computer-implemented method in a processing server of analyzing image data to automatically assess hail damage to a property is provided. The method may include: accessing digital image data depicting a roof of the property; segmenting, by a processor, the digital image data into a set of digital images depicting a respective set of portions of the roof of the property; analyzing, by the processor using a convolutional neural network (CNN), the set of digital images to identify a set of regions of potential hail damage; extracting, by the processor, a set of features from each of the set of regions of potential hail damage; and analyzing, by the processor, the set of features using a classification model to generate a set of outputs indicating a presence of hail damage in the set of digital images.

In another embodiment, a system for analyzing image data to automatically assess hail damage to a property is provided. The system may include a memory configured to store non-transitory computer executable instructions, and a processor interfacing with the memory. The processor may be configured to execute the non-transitory computer executable instructions to cause the processor to: access digital image data depicting a roof of the property, segment the digital image data into a set of digital images depicting a respective set of portions of the roof of the property, analyze, using a convolutional neural network (CNN), the set of digital images to identify a set of regions of potential hail damage, extract a set of features from each of the set of regions of potential hail damage, and analyze the set of features using a classification model to generate a set of outputs indicating a presence of hail damage in the set of digital images.

In a further embodiment, a non-transitory computer-readable storage medium configured to store instructions is provided. The instructions when executed by a processor may cause the processor to perform operations comprising: accessing digital image data depicting a roof of a property; segmenting the digital image data into a set of digital images depicting a respective set of portions of the roof of the property; analyzing, using a convolutional neural network (CNN), the set of digital images to identify a set of regions of potential hail damage; extracting a set of features from each of the set of regions of potential hail damage; and analyzing the set of features using a classification model to generate a set of outputs indicating a presence of hail damage in the set of digital images.

BRIEF DESCRIPTION OF THE DRAWINGS

The figures described below depict various aspects of the system and methods disclosed herein. It should be understood that each figure depicts an embodiment of a particular aspect of the disclosed system and methods, and that each of the figures is intended to accord with a possible embodiment thereof. Further, wherever possible, the following description refers to the reference numerals included in the following figures, in which features depicted in multiple figures are designated with consistent reference numerals.

DETAILED DESCRIPTION

Figure 1:
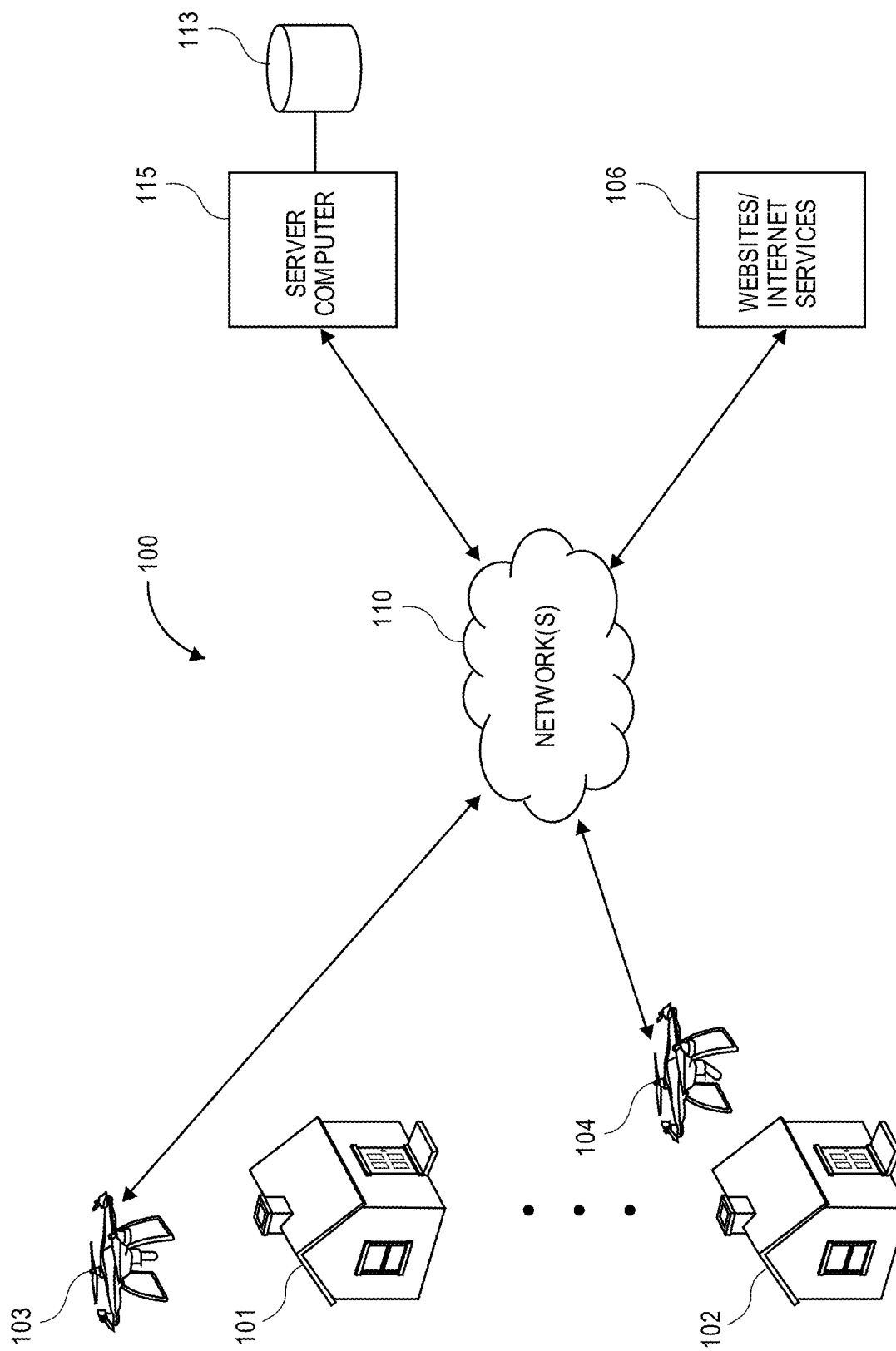
FIG. 1 depicts an overview of an exemplary system of components configured to facilitate various functionalities, in accordance with some embodiments.

The present embodiments may relate to, inter alia, analyzing image data to identify and assess property damage such as hail damage. Conventionally, property damage is assessed through manual inspection of the property or, in some cases, examination of image data depicting the property. However, these techniques are expensive and inefficient, among other drawbacks. To alleviate these shortcomings, the present embodiments incorporate certain digital image processing and model analyses to effectively, efficiently, and accurately identify and assess property damage.

According to certain aspects, systems and methods may train a set of image models that may be used to classify property damage that may be caused by a hail event. Additionally, the systems and methods may capture and/or access digital image data that depicts a roof of the property, and analyze the digital image data using the trained image models. In particular, the systems and methods initially analyze the digital image data using a convolutional neural network (CNN), extract a set of features resulting from the CNN analysis, and analyze the set of features using a classification model to generate a set of outputs that are indicative of a presence of hail damage to the roof of the property. The systems and methods may additionally facilitate insurance claim calculations and functionalities based on any detected presence of hail damage.

The systems and methods therefore offer numerous benefits. In particular, by utilizing multiple image models in analyzing image data, the systems and methods are able to accurately identify and assess hail damage to properties. Additionally, the image analyses may eliminate the need for manual inspection and/or manual examination of images. This reduces costs and expenses, savings which ultimately may be passed down to customers. Moreover, customers may experience shorter times between a hail damage event and a processing of an insurance claim. It should be appreciated that other benefits are envisioned.

The systems and methods discussed herein address a challenge that is particular to technology associated with assessing property damage. In particular, the challenge relates to a difficulty in effectively and efficiently identifying and assessing property damage that may result from certain events. In conventional situations, entities rely on human judgment to identify and classify property damage, which is often time-consuming and/or inaccurate. In contrast, the systems and methods utilize multiple image models in a specific, sequential manner to analyze image data depicting properties and assess hail damage that may be depicted in the image data. Therefore, because the systems and methods employ the collection, analysis, and communication of image data, the systems and methods are necessarily rooted in computer technology in order to overcome the noted shortcomings that specifically arise in the realm of technology associated with assessing property damage.

FIG. 1 illustrates an overview of a system 100 of components configured to facilitate the systems and methods. It should be appreciated that the system 100 is merely an example and that alternative or additional components are envisioned.

As illustrated in FIG. 1, the system 100 may include a set of properties 101, 102, each of which may be any type of building, structure, or the like. For example, the properties 101, 102 may be any single- or multi-unit house, flat, townhome, apartment building, condo building, commercial building, auxiliary building for a property (e.g., a garage), or the like. FIG. 1 depicts two properties 101, 102, however it should be appreciated that fewer or more properties are envisioned.

The system 100 may further include a set of aerial vehicles 103, 104 capable of any type of air travel or flight. According to embodiments, the aerial vehicles 103, 104 may be unmanned aerial vehicles (UAVs; aka "drones") or may be manned by a pilot (e.g., airplane, helicopter, etc.). If the aerial vehicles 103, 104 is a UAV(s), the UAV(s) may be autonomously controlled or may be controlled remotely. Each of the set of aerial vehicles 103, 104 may be configured with one or more image sensors that may be capable of capturing digital image data, where the image sensor(s) may be controlled autonomously, or locally or remotely by an individual. It should be appreciated that each of the set of aerial vehicles 103, 104 may be configured with one of more image sensors, video recorders, and/or cameras. In some embodiments, each of the set of aerial vehicles 103, 104 may be configured with a memory device for storing any captured image data. FIG. 1 depicts two aerial vehicles 103, 104, however it should be appreciated that fewer or more aerial vehicles are envisioned.

In operation, the image sensor(s) (or cameras) of the set of aerial vehicles 103, 104 may be configured to capture digital images that depict various portions of the properties 101, 102. In particular, the digital images may depict exterior portions of the properties 101, 102, such as roofs, entryways, exterior materials, foundations, yards, auxiliary buildings, and/or any other physical structures or elements associated with the properties 101, 102 that may be visible.

In addition or as an alternative to aerial digital images of the properties 101, 102 being captured by one or more drones or aerial vehicles 103, 104, additional or alternate digital images of the properties 101, 102 may be acquired in other manners. For instance, digital images of the properties 101, 102 may be acquired by one or more image sensors or cameras of a smart or autonomous vehicle, a vehicle dashboard mounted camera, a user mobile device or camera, image sensors associated with surrounding properties, and/or internet websites or social media services 106.

The system 100 may also include a server computer 115 that may communicate with the aerial vehicles 103, 104 and with the websites/internet services 106 via one or more networks 110. In certain embodiments, the network(s) 110 may support any type of data communication via any standard or technology (e.g., GSM, CDMA, TDMA, WCDMA, LTE, EDGE, OFDM, GPRS, EV-DO, UWB, Internet, IEEE 802 including Ethernet, WiMAX, Wi-Fi, Bluetooth, and others). The server computer 115 may be configured to interface with or support a memory or storage 113 capable of storing various data. In particular, the memory or storage 113 may store data associated with image models such as one or more CNNs, classification model(s), and/or the like. In embodiments, the server computer 115 may train the image models using a set of training data, and store the trained image models in the memory or storage 113. Additionally, the memory or storage 113 may store previously-captured images of the properties 101, 102.

According to some embodiments, the server computer 115 may be associated with an entity, business, company, enterprise, operation, individual, or the like, that may offer or provide services for customers or clients. For example, the server computer 115 may be associated with an insurance provider.

In operation, the image sensor(s) (or cameras) of the aerial vehicles 103, 104 may capture digital image data that depicts various portions of the properties 101, 102, and may transmit the digital image data to the server computer 115 via the network(s) 110. In embodiment, an additional electronic device (not shown in FIG. 1; e.g., a laptop computer) may receive the digital image data from the aerial vehicles 103, 104 and transmit the digital image data to the server 115 via the network(s) 110. The server computer 115 may process the digital image data (either solely or in conjunction with digital image data acquired via other sources, such as the websites/internet services 106, mobile devices, autonomous vehicles, or neighboring properties) to segment the digital image data into a set of images depicting different portion or sections of the properties 101, 102 (e.g., the roofs of the properties 101, 102).

Additionally, the server computer 115 may analyze the digital image data using the stored image models. In particular, the server computer 115 may analyze the digital image data using a CNN to identify a set of regions in the digital image data that depict potential hail damage. Additionally, the server computer 115 may extract a set of features from each of the set of regions, and input the set of features into a classification model to generate a set of outputs that are indicative of a presence of hail damage in the digital image data. The server computer 115 may facilitate additional functionalities, including calculating estimated damage amounts, facilitating insurance processing, and/or the like. These and additional functionalities are described in further detail with respect to the subsequent figures.

Figure 2:
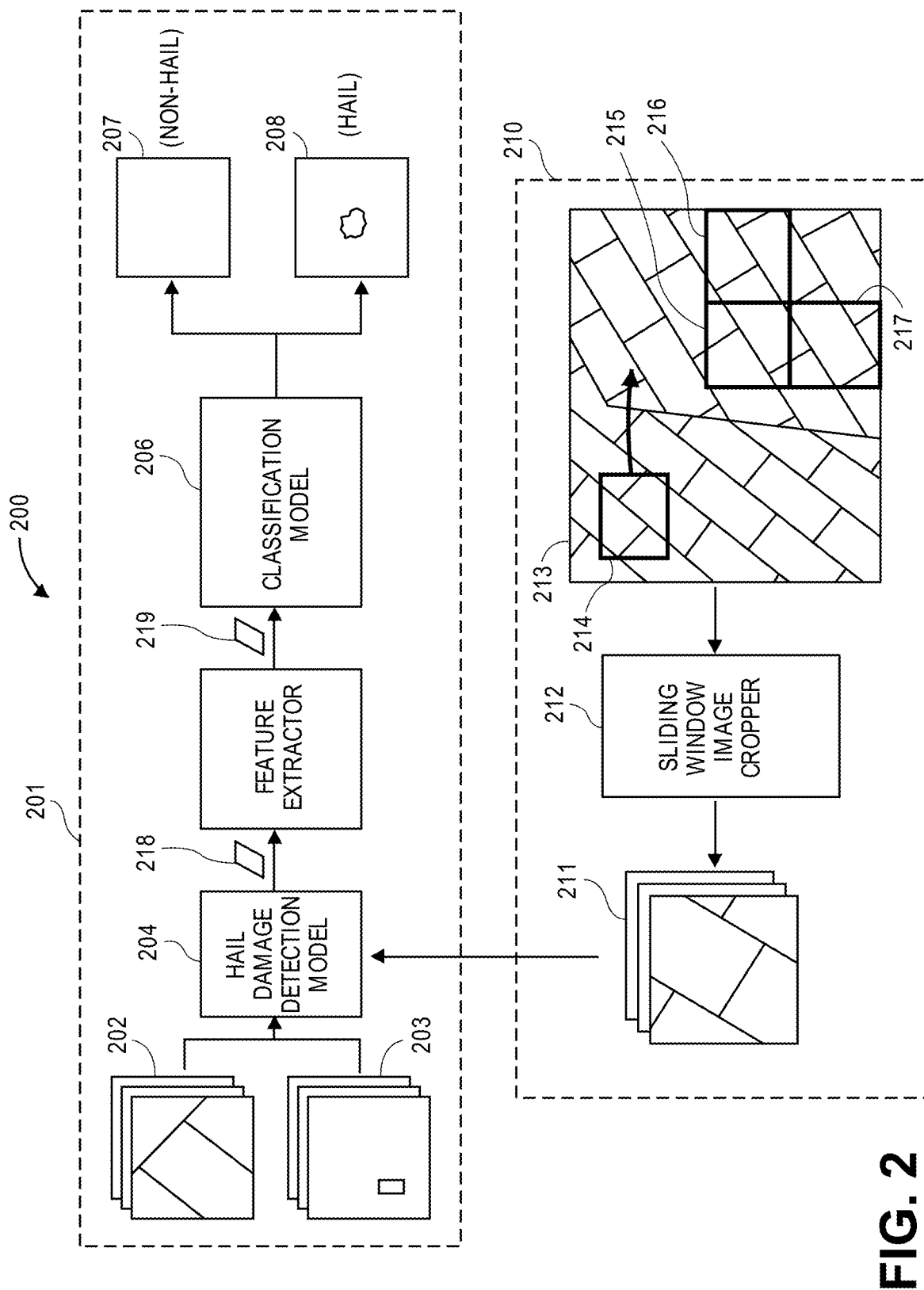
FIG. 2 depicts an exemplary representation of various components and functionalities associated with the systems and methods, in accordance with some embodiments.

FIG. 2 depicts an example representation 200 of various components and functionalities associated with the systems and methods. It should be appreciated that the various components of the representation 200 and the connections therebetween are merely exemplary, and that additional and alternative components are envisioned. In embodiments, the components and functionalities of the representation 200 may be implemented on and supported by one or more computing devices, such as the server computer 115 as discussed with respect to FIG. 1.

As depicted in FIG. 2, the representation 200 may be segmented into an image training and analyzing section 201 and an image processing section 210, although the components and functionalities associated therewith may overlap and be interchangeable. The section 201 may include a set of training images 202, a set of training labels 203, and a hail damage detection model 204. In embodiments, the hail damage detection model 204 may incorporate a convolutional neural network (CNN) that may consist of multiple layers, including an input layer, an output layer, and a set of hidden layers.

The hail damage detection model 204 may be trained using the set of training images 202 and the set of training labels 203, thereby generating the weights associated with the layers of the hail damage detection model 204. According to embodiments, the set of training images 202 may include images that may or may not depict hail damage to properties, and the set of training labels 203 may include data identifying whether the set of training images 202 actually depict hail damage to properties. Although the hail damage detection model 204 is described as being a CNN, it should be appreciated that other types of neural networks are envisioned (e.g., other feedforward neural networks, recurrent neural networks, etc.).

The image processing section 210 may include digital image data 213 that may depict a portion of a property. For example, as shown in FIG. 2, the digital image data 213 may depict a roof of a property, and may be captured by an aerial vehicle such as a UAV (or other image capturing component). The digital image data 213 as depicted in FIG. 2 is merely used for illustrative purposes, and it should be appreciated that additional and alternative digital image data is envisioned.

A sliding window image cropper 212 component may be used to crop the digital image data 213 into a set of digital images 211. In particular, the sliding window image cropper 212 may crop the digital image data 213 using a sliding window 214 component that may be configured to segment the digital image data 213 according to the shape of the sliding window 214. For example, FIG. 2 depicts a set of digital images 215, 216, 217 that are included in the set of digital images 211, each one a segment of the digital image data 213.

The set of digital images 211 may be input into the hail damage detection model 204, which may be subsequent to when the hail damage detection model 204 is trained with the set of training images 202 and the set of training labels 203. The hail damage detection model 204 may analyze the set of digital images 211 and output a set of data 218 representative of a set of regions depicted in the set of digital images 211 that the hail damage detection model 204 estimates have experienced hail damage. In embodiments, the set of regions of the set of data 218 may include regions(s) that have actually experienced hail damage and/or region(s) that have not experienced hail damage. Additionally, not every digital image in the set of digital images 211 may be represented by the set of regions in the set of data 218 (and conversely, each of the digital images 211 may be represented by the set of regions in the set of data 218).

The set of data 218 may be input into a feature extractor component 205. In embodiments, the feature extractor component 205 may be configured to analyze the set of data 218 to extract a set of features from the set of regions that may be indicative of actual hail damage to the corresponding region(s). In particular, the set of features may include textual features extracted using grey-scale co-occurrence matrix and information theory, color features extracted using color histograms and statistics, and/or shape features using connected components and aspect ratios. It should be appreciated that the set of features may include additional or alternative features.

The feature extractor component 205 may output a set of data 219 representative of the set of features extracted from the set of data 218. The set of data 219 may be input into a classification model 206. In an implementation, the set of data 218 may additionally or alternatively be input into the classification model 206. According to embodiments, the classification model 206 may be a machine learning model that may employ a gradient-boosting classifier which may, based on the extracted set of features included in the set of data 219, output a confidence level for each of the regions in the set of regions included in the set of data 218. According to embodiments, the confidence level indicates a confidence that the corresponding region of the set of regions depicts hail damage, where the confidence level may be on a scale (e.g., a numeric value ranging from 1 to 10), binary (e.g., a "0" or "1"), or another convention.

The classification model 206 may output a set of data 207 indicative of region(s) of the set of regions that are classified as not having hail damage (i.e., having a confidence level that does not meet or exceed a threshold value), and a set of data 208 indicative of region(s) of the set of regions that are classified as having hail damage (i.e., having a confidence level that meets or exceeds a threshold value).

A computing device (e.g., the server computer 115) may facilitate additional functionalities based on the sets of data 207, 208. For example, the computing device may calculate an estimated damage amount to the roof of a property depicted in the digital image data 213 based on the hail damage indicated in the set of data 208, and/or facilitate preparation of an insurance claim according to the estimated damage amount. It should be appreciated that additional functionalities are envisioned.

Figure 3:
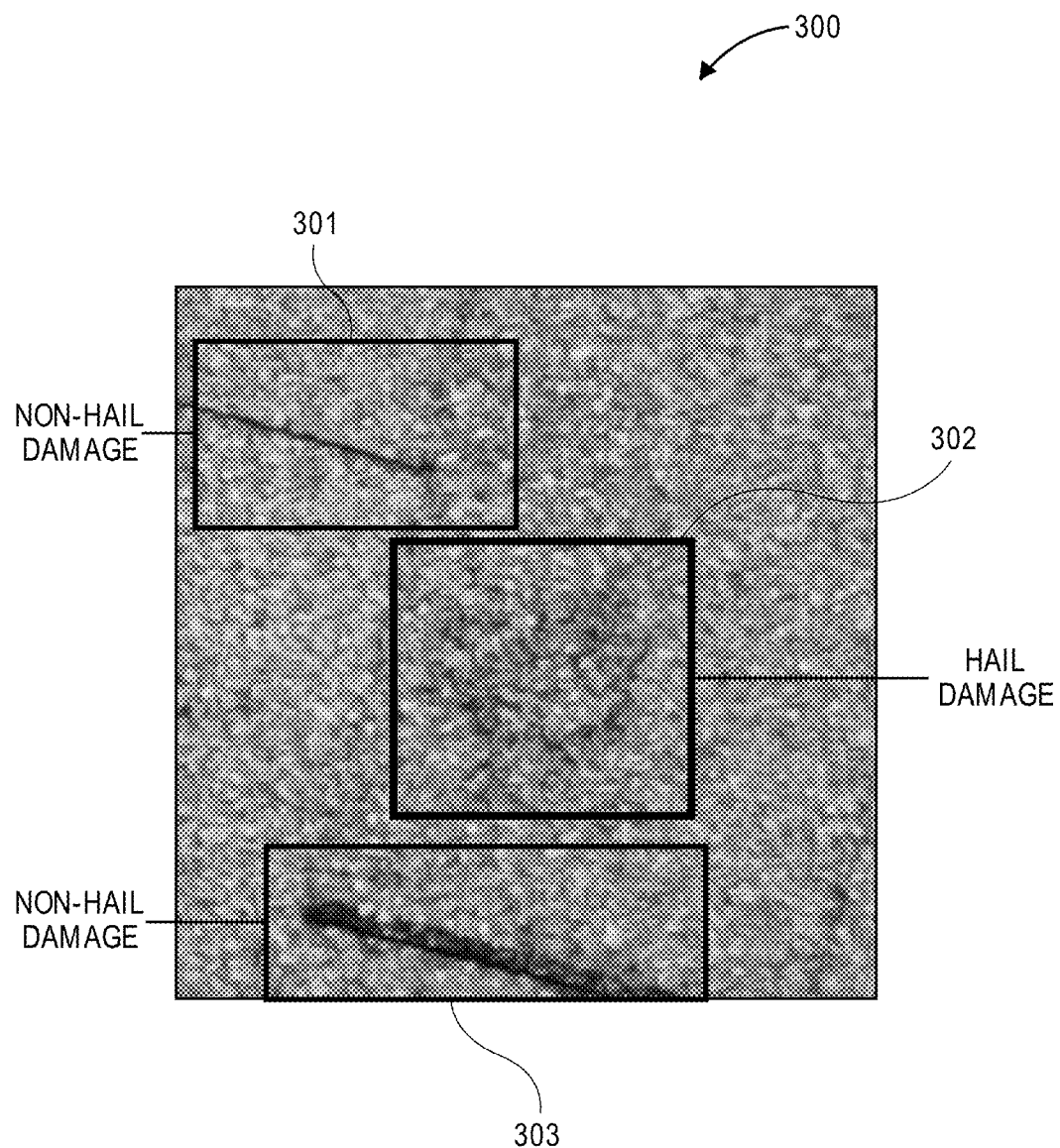
FIG. 3 depicts an example image of a roof of a property and elements thereof, in accordance with some embodiments.

FIG. 3 depicts an exemplary image 300 of a roof of a property. The image 300 includes three (3) regions that were identified as potentially depicting hail damage (in particular, regions 301, 302, and 303). Each of the regions 301, 302, 303 depicts anomalies in a roof, which typically consists of uniform and multiple shingles, tiles, slate, etc. As depicted in FIG. 3, the regions 301 and 303 depict seams or edges that delineate roof shingles, and thus do not depict actual hail damage. In contrast, the region 302 depicts actual hail damage.

In embodiments, when the image 300 is input into the hail damage detection model 204 as discussed with respect to FIG. 2, the hail damage detection model may identify the regions 301, 302, 303 as those that may depict hail damage. After the feature extractor 205 extracts certain features from the regions 301, 302, 303, the resulting data may be input into the classification model 206, which determines a confidence level for each of the regions 301, 302, 303, which may represent a likelihood that the corresponding regions 301, 302, 303 depict actual hail damage. For example, if the confidence level is binary, the classification model 206 may output a "1" for the region 302, and a "0" for each of the regions 301 and 303.

Figure 4:
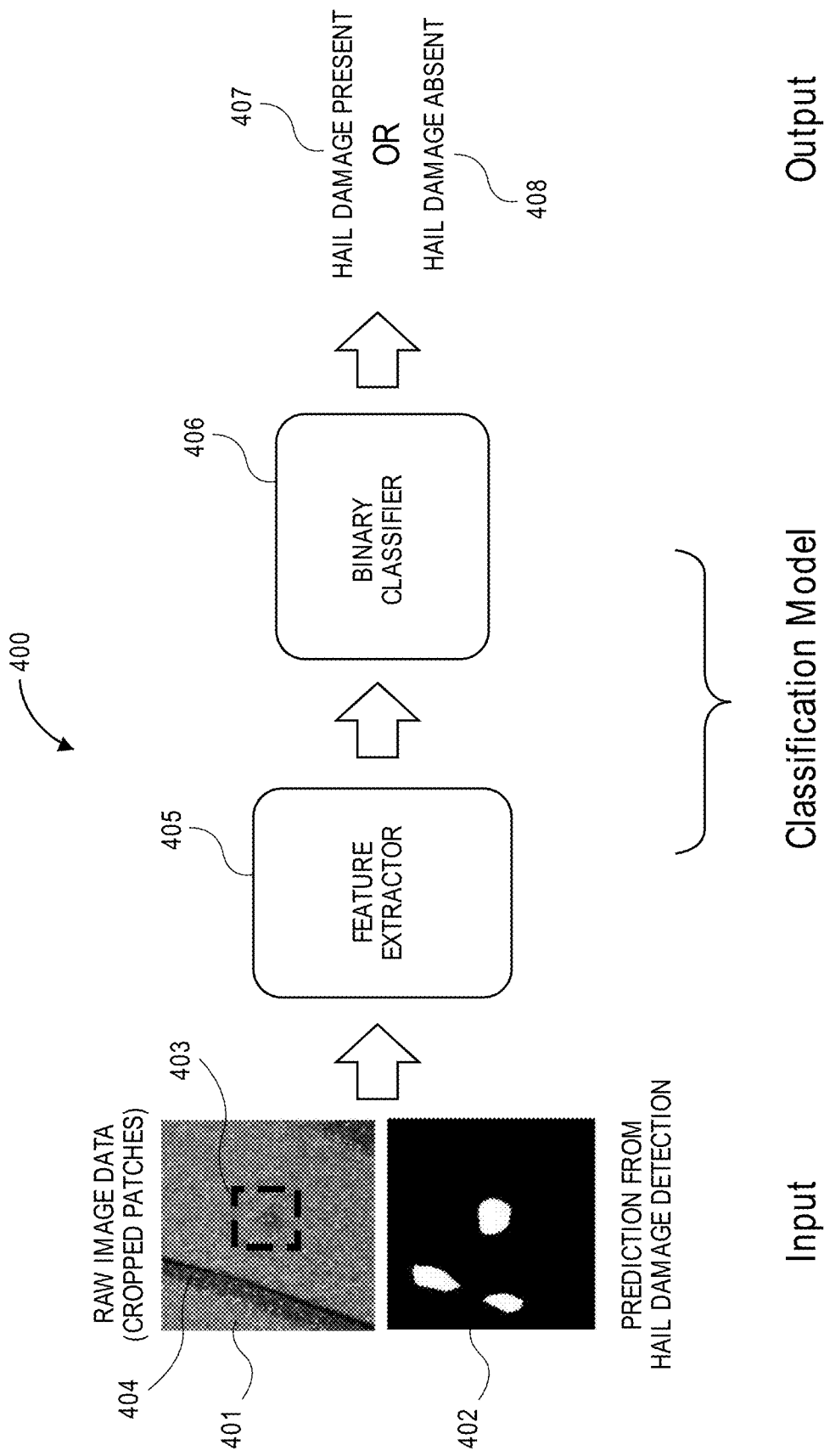
FIG. 4 depicts an exemplary representation of a classification model and functionalities thereof, in accordance with some embodiments.

FIG. 4 depicts a representation 400 of certain components associated with a classification model, such as the classification model 206 as discussed with respect to FIG. 2. It should be appreciated that the various components of the representation 400 and the connections therebetween are merely exemplary, and that additional and alternative components are envisioned.

The representation 400 includes an exemplary raw image 401 and a representation 402 of hail damage prediction corresponding to the raw image 401. In embodiments, the representation 402 may be output by a CNN or other image model (such as the hail damage detection model 204 as discussed with respect to FIG. 2). As depicted in FIG. 4, the raw image 401 includes a region 403 depicting hail damage, and a region 404 depicting an edge or seam that delineates roof shingles. Accordingly, the representation 402 includes three (3) regions that correspond to the regions 403, 404, where two of the regions in the representation 402 correspond to the region 404. The regions of the representation 402 may represent a set of inputs for the classification model.

According to embodiments, the representation 402 (and specifically, the regions thereof) may be input into a feature extractor component 405 (which may be the feature extractor component 205 as discussed with respect to FIG. 2). The feature extractor component 405 may extract a set of features from each of the regions included in the representation 402, where the extracted sets of features may be input into a binary classifier 406 (which may be the classification model 206 as discussed with respect to FIG. 2). The binary classifier 406 may be configured to output a binary value (e.g., a "0" or "1"), where a positive binary value may be indicative of actual hail damage in the corresponding region (407) and a negative binary value may be indicative of an absence of hail damage in the corresponding region (408). A computing device may assess or use the outputs 407, 408 in various calculations and functionalities.

Figure 5:
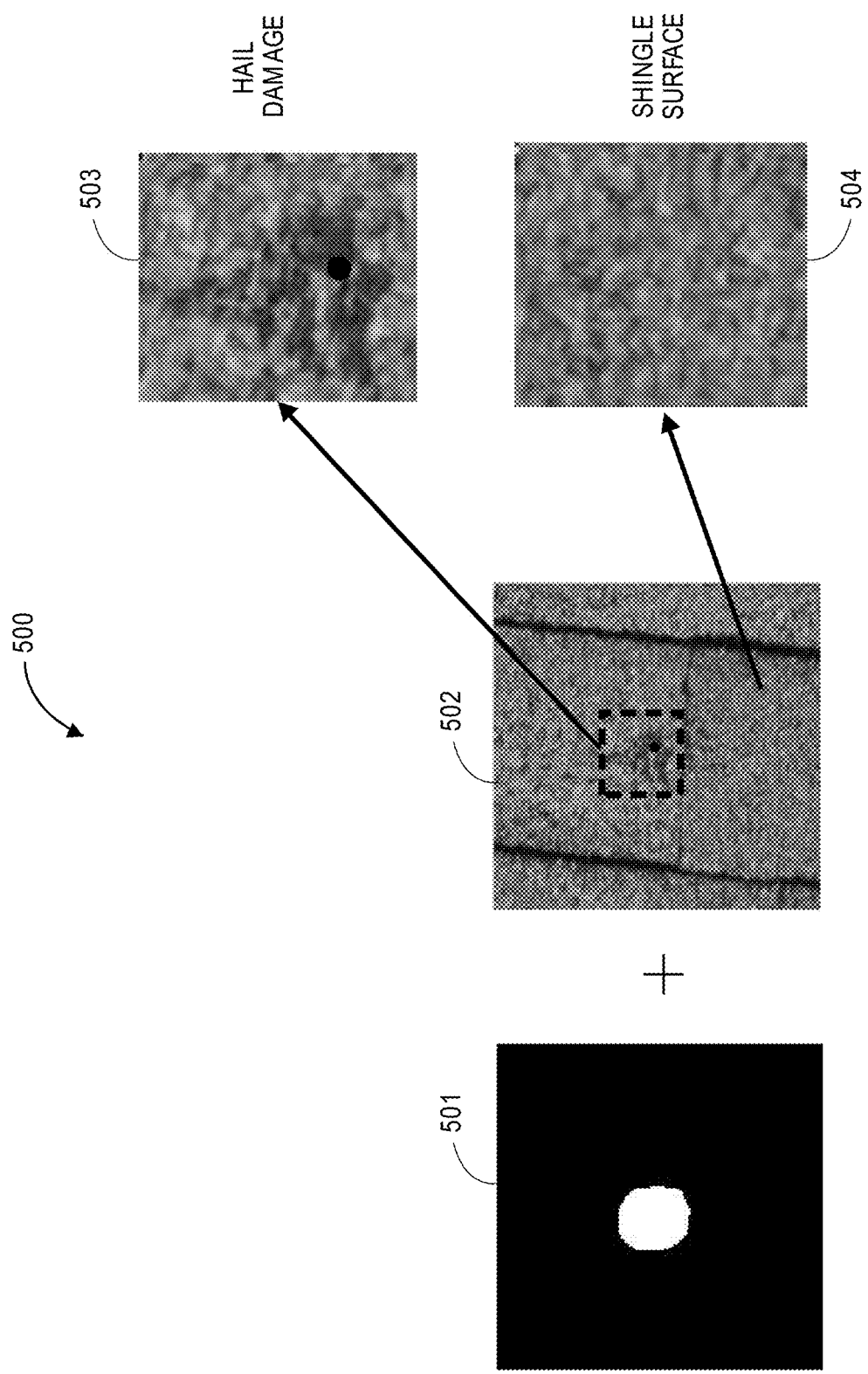
FIG. 5 depicts an example of feature extraction functionalities, in accordance with some embodiments.

FIG. 5 depicts a representation 500 of the feature extraction functionalities as discussed herein. The representation 500 includes a prediction 501 of hail damage that may be output by a CNN or other image model (such as the hail damage detection model 204 as discussed with respect to FIG. 2), and a raw image 502 from which the prediction 501 may be generated by the image model. FIG. 5 further depicts specific magnified sections of the raw image 502: a section 503 depicting the hail damage and a section 504 depicting a shingle surface. As may be inferred from FIG. 5, the section 503 includes an area of contrast that represents the hail damage, whereas the section 504 is more consistent in texture.

Figure 6:
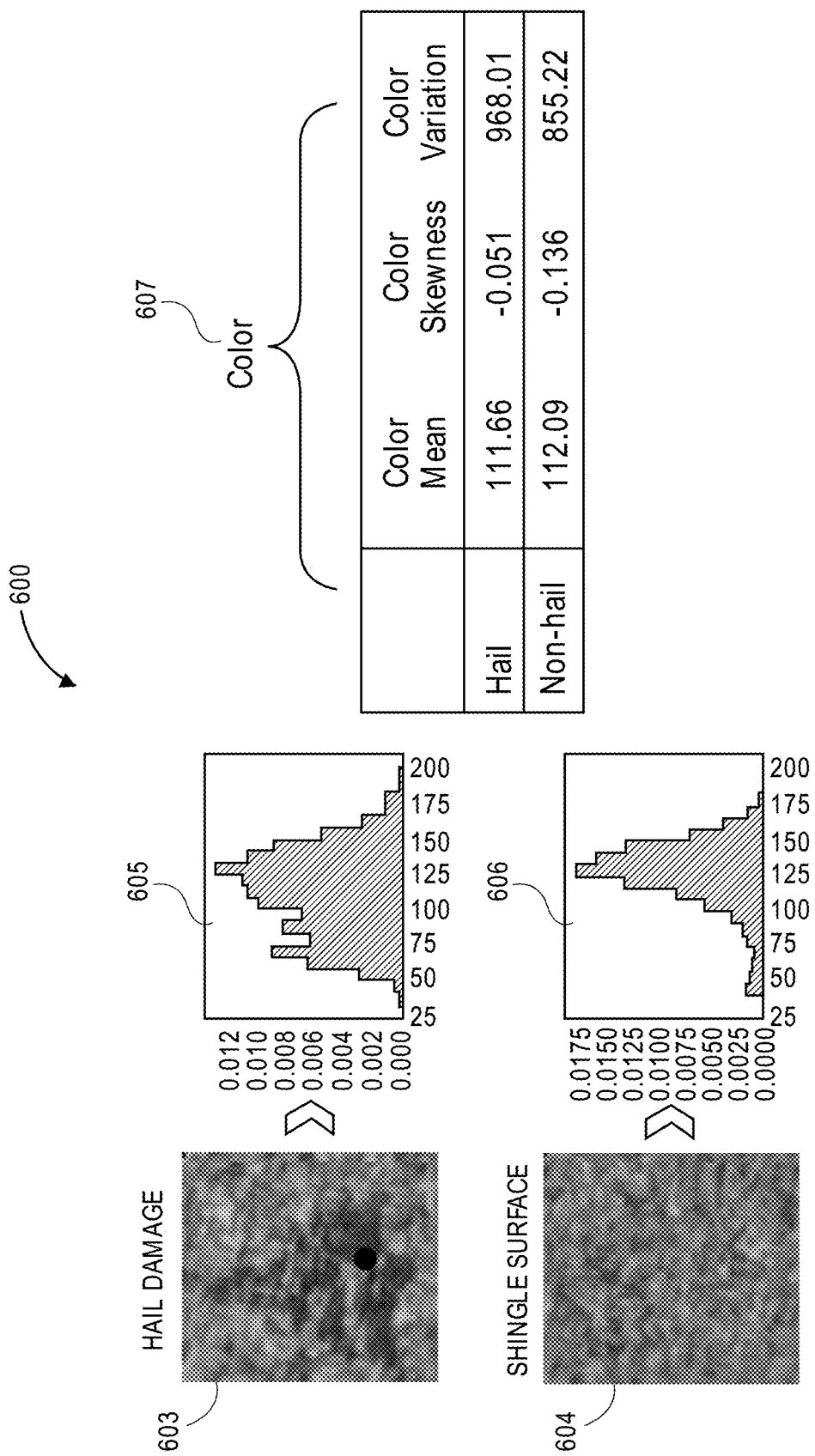
FIG. 6 depicts an exemplary representation of extracted color features, in accordance with some embodiments.

FIG. 6 depicts a representation 600 of how color features may be extracted from images. The representation 600 may include a section 603 of an image depicting hail damage (which may be the same as the section 503 of FIG. 5), and a section 604 of an image depicting a shingle surface (which may be the same as the section 504 of FIG. 5). A feature extractor (such as the feature extractor 205 as discussed with respect to FIG. 2) may analyze the sections 603, 604 and generate respective histograms 605, 606 that may represent the colors depicted throughout the sections 603, 604. As depicted in FIG. 6, the histogram 605 indicates a wider range of colors in the section 603 depicting hail damage, versus the range of colors depicted in the histogram 606 corresponding to the section 604 depicting the shingle surface.

FIG. 6 also depicts a set of statistics 607 associated with the histograms 605, 606. In particular, the set of statistics 607 include a color mean value, a color skewness value, and a color variation value for each of the histograms 605, 606. It should be appreciated that alternative or additional color features and statistics thereof are envisioned. In embodiments, a computing device may determine how to classify the respective regions in the image sections 603, 604 based on the histograms 605, 606 and/or the set of statistics 607. For example, the computing device may determine that because the color variation for the histogram 605 (968.01) exceeds a threshold value (e.g., 900), the section 603 should be classified as hail damage; similarly, the computing device may determine that because the color variation for the histogram 606 (855.72) is less than the threshold value, the section 604 should not be classified as hail damage.

Figure 7A:
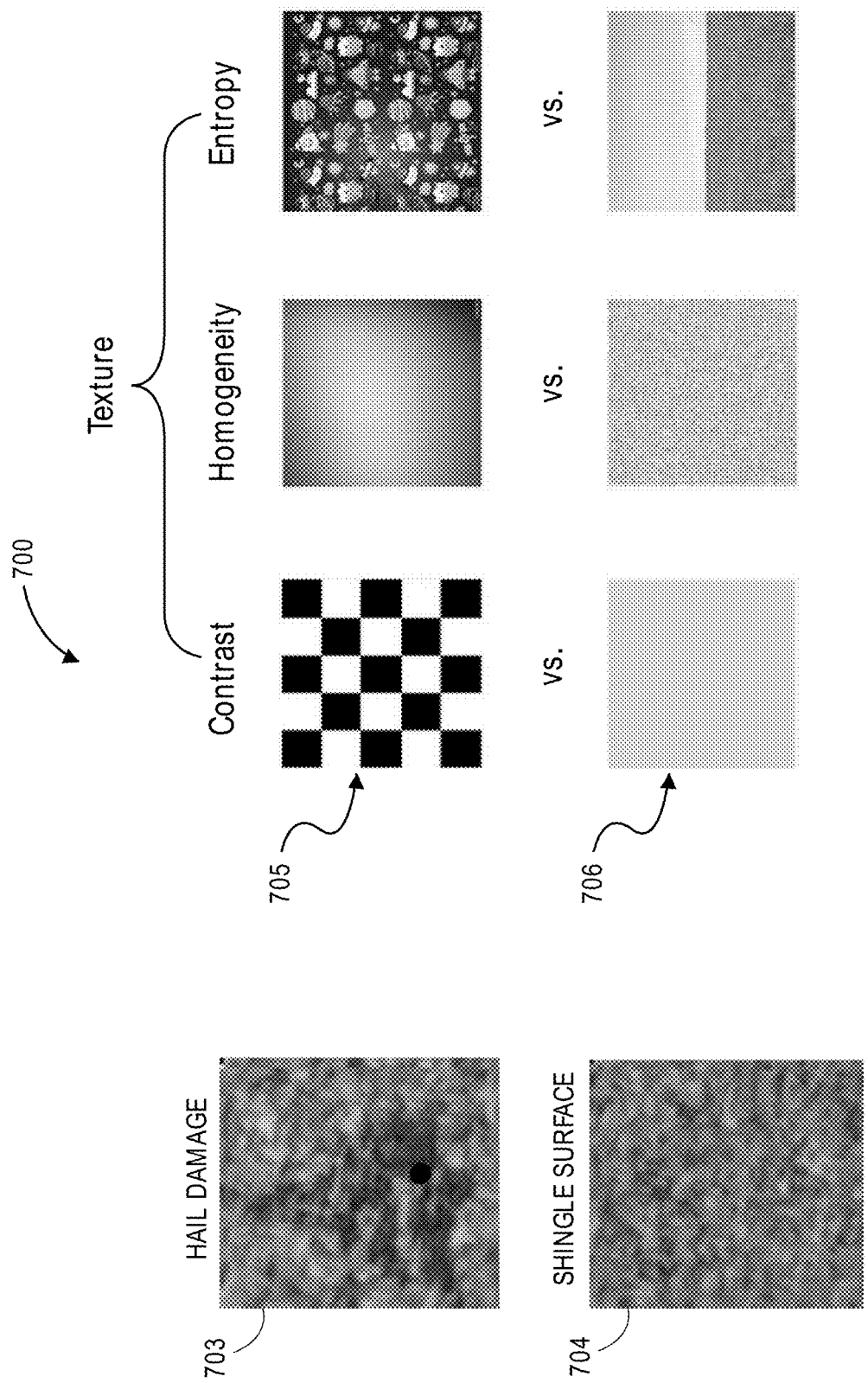
FIGS. 7A and 7B depict exemplary representations of extracted texture features, in accordance with some embodiments.
Figure 7B:
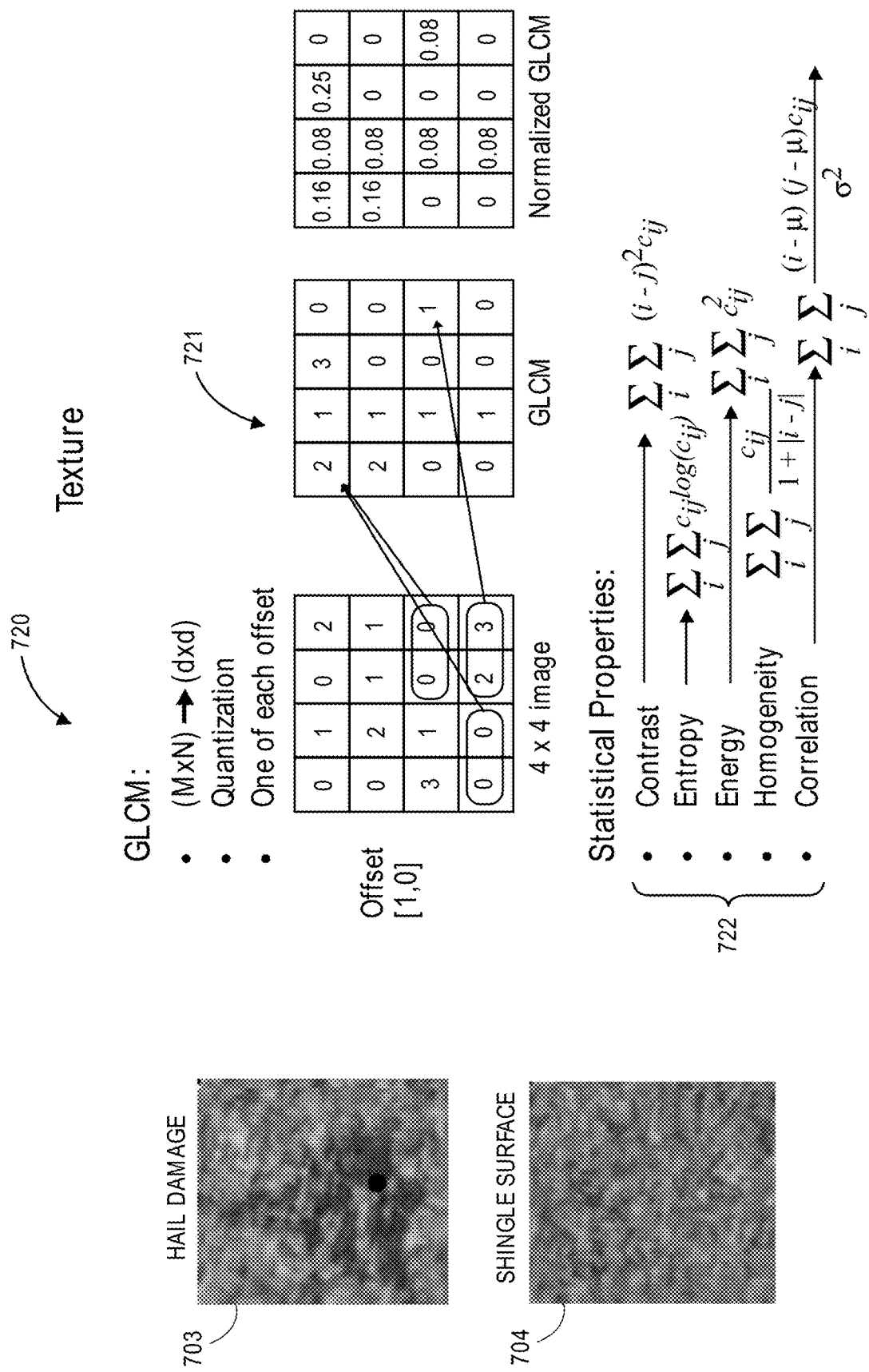

FIGS. 7A and 7B depict respective representations 700, 720 of how texture features may be extracted from images. Each of the representations 700, 720 may include a section 703 of an image depicting hail damage (which may be the same as the section 503 of FIG. 5), and a section 704 of an image depicting a shingle surface (which may be the same as the section 504 of FIG. 5). A feature extractor (such as the feature extractor 205 as discussed with respect to FIG. 2) may analyze the sections 703, 704 and identify certain texture features from the sections 703, 704.

In particular, as depicted in FIG. 7A, the texture features include contrast, homogeneity, and entropy. It should be appreciated that alternative or additional texture features are envisioned. FIG. 7A depicts a feature representation 705 associated with the section 703 and a feature representation 706 associated with the section 704. In embodiments, a computing device may determine how to classify the respective regions in the image sections 703, 704 based on the feature representations 705, 706. For example, the computing device may determine that the section 703 includes more contrast, less homogeneity, and more entropy than that of the section 704, and may thus classify the section 703 as hail damage and the section 704 as non-hail damage.

The representation 720 of FIG. 7B depicts certain data and information associated with the texture feature extraction. In particular, the representation 720 may include a set of Gray-Level Co-Occurrence Matrices 721 (GLCM) output as part of a textural analysis of the image sections 703, 704. Additionally, the representation 720 may identify a set of statistical properties 722, including contrast, entropy, energy, homogeneity, and correlation. The computing device may facilitate a GLCM analysis and/or any of these statistical analyses to classify the respective regions in the image sections 703, 704.

Figure 8:
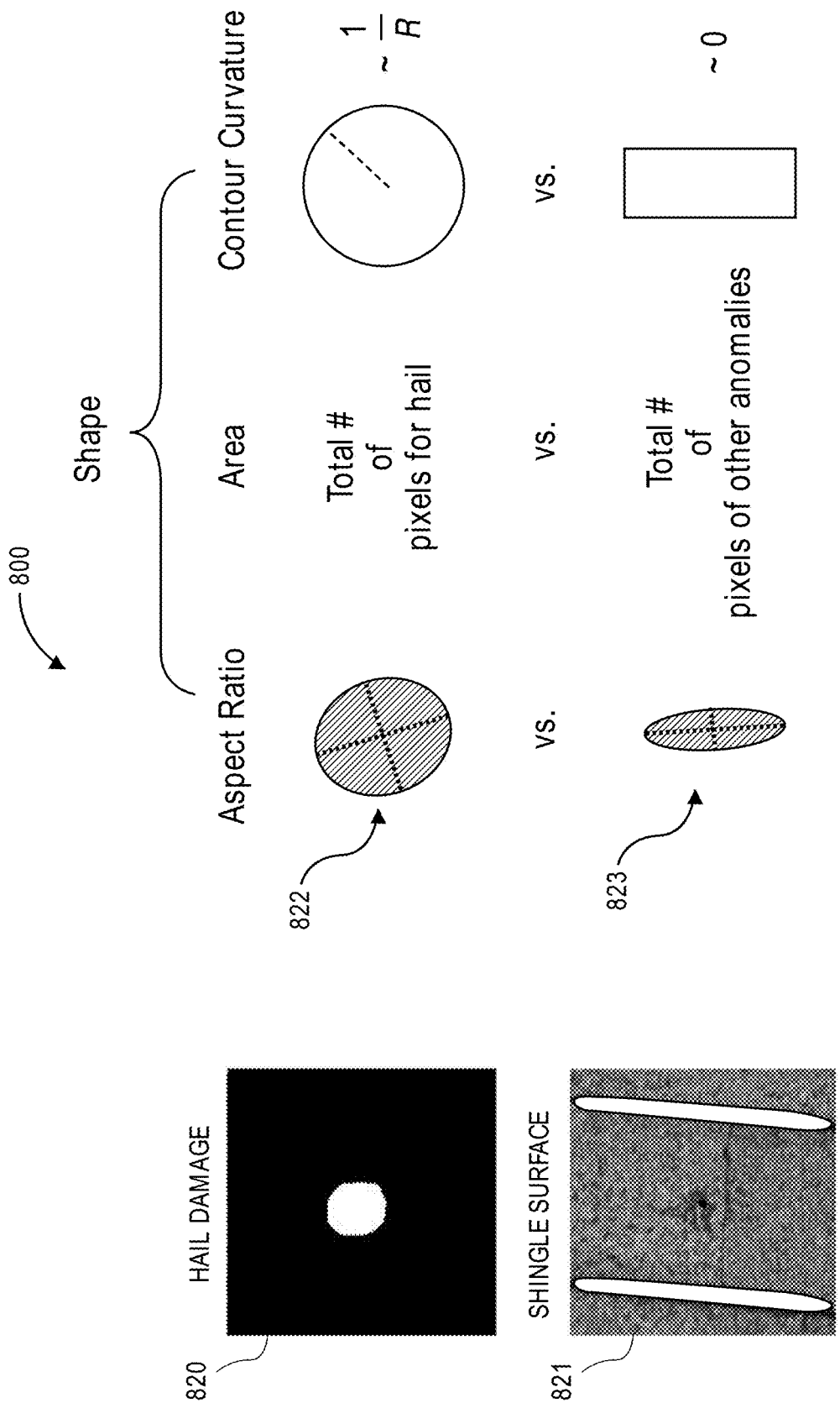
FIG. 8 depicts an exemplary representation of extracted shape features, in accordance with some embodiments.

FIG. 8 depicts a representation 800 of how shape features may be extracted from images. The representation 800 may include a processed section 820 of an image depicting hail damage, and a processed section 821 of an image depicting a shingle surface. A feature extractor (such as the feature extractor 205 as discussed with respect to FIG. 2) may analyze the sections 820, 821 and identify certain shape features from the sections 820, 821.

In particular, as depicted in FIG. 8, the shape features include aspect ratio, area, and contour curvature. It should be appreciated that alternative or additional shape features are envisioned. FIG. 8 depicts a feature representation 822 associated with the section 820 and a feature representation 823 associated with the section 821. Based on the feature representations 822, 823, a computing device may determine that the section 820 includes an aspect ratio closer to one (1), a greater (or lesser) pixel area for potential damage, and a greater contour curvature than that of the section 821. Similarly, the computing device may determine how to classify the respective regions in the image sections 820, 821 based on the feature representations 822, 823. For example, the computing device may classify the image section 820 as depicting hail damage and the image section 821 as not depicting hail damage, based on one or more of the shape features.

Figure 9:
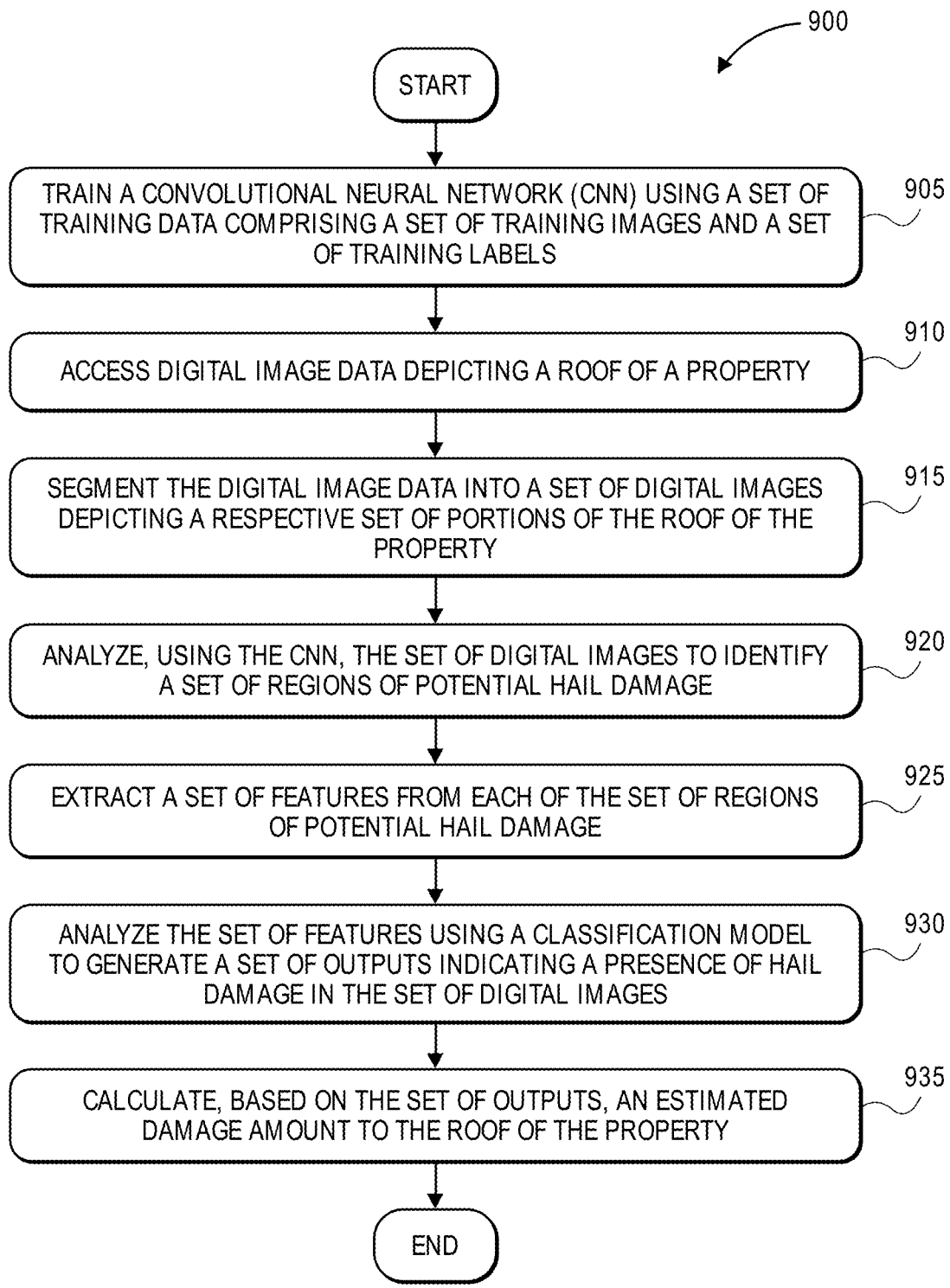
FIG. 9 depicts a flow chart of an exemplary method for analyzing image data to automatically assess hail damage to a property, in accordance with some embodiments.

FIG. 9 depicts a block diagram of an exemplary computer-implemented method 900 in a processing server of analyzing image data to automatically assess hail damage to a property. According to some embodiments, the processing server may store or otherwise have access to image processing models and data related thereto. The method 900 may be facilitated by the processing server.

The method 900 may begin when the processing server trains (block 905) a convolutional neural network (CNN) using a set of training data comprising a set of training images and a set of training labels. The processing server may also access (block 910) digital image data depicting a roof of a property. In embodiments, the processing server may receive the digital image data from a UAV, or may retrieve the digital image data from memory.

The processing server may segment (block 915) the digital image data into a set of digital images depicting a respective set of portions of the roof of the property. In embodiments, the processing server may segment the digital image data using a sliding window technique. The processing server may analyze (block 920), using the CNN, the set of digital images to identify a set of regions of potential hail damage.

The processing server may extract (block 925) a set of features from each of the set of regions of potential hail damage. In embodiments, the processing server may extract, from each of the set of regions, at least one of a set of texture features, a set of color features, and a set of shape features.

The processing server may analyze (block 930) the set of features using a classification model to generate a set of outputs indicating a presence of hail damage in the set of digital images. In embodiments, the processing server may analyze the set of features using the classification module to generate a set of binary outputs respectively indicating whether hail damage is present in the set of features. Alternatively, the processing server may input each of the set of features into the classification model and generate the set of outputs, each of which may include a confidence level indicating the presence of hail damage in the set of digital images.

The processing server may calculate (block 935), based on the set of outputs, an estimated damage amount to the roof of the property. Additionally, the processing server may facilitate any insurance processing, including a claim submission or policy modification, based on the estimated damage amount.

Figure 10:
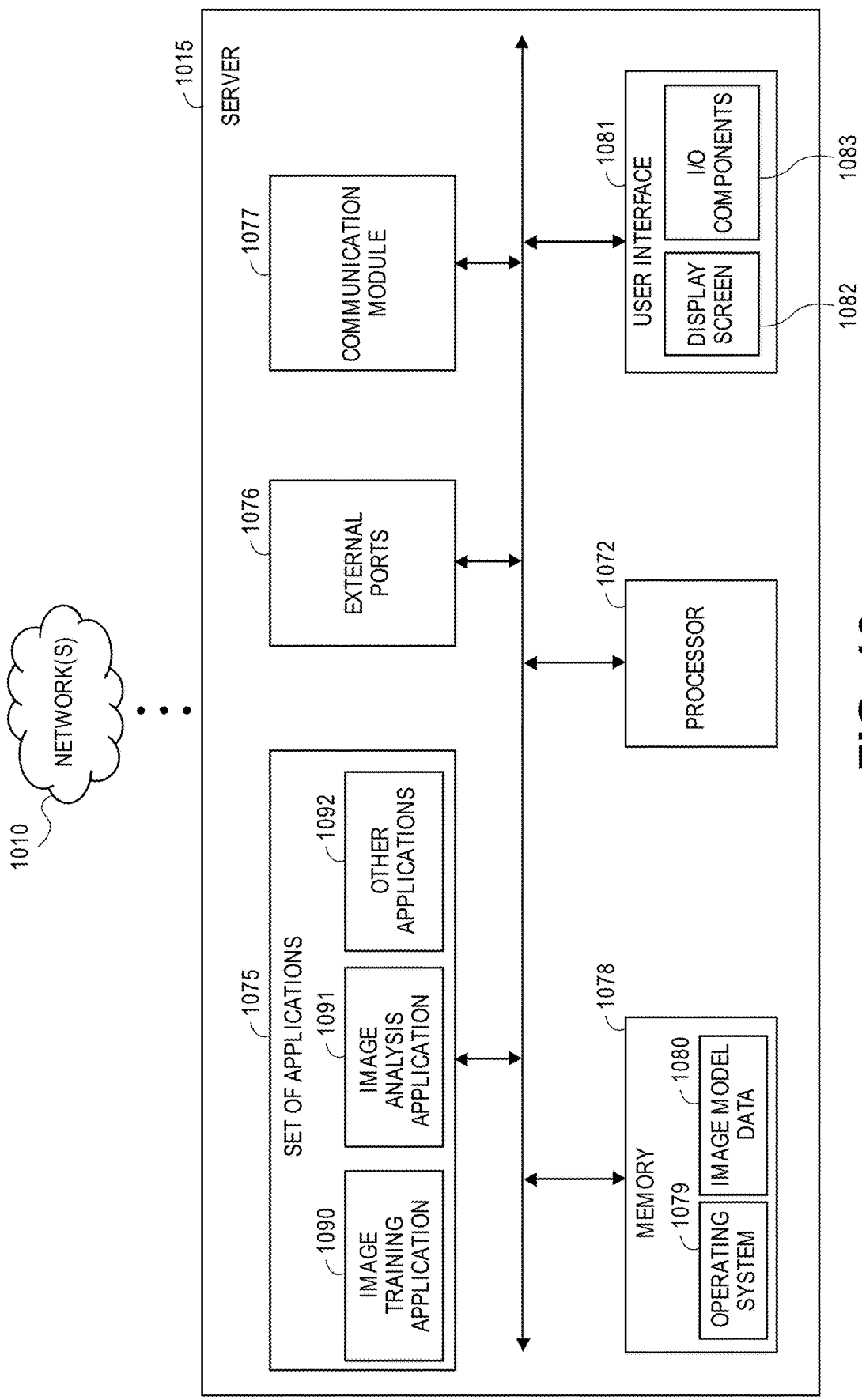
FIG. 10 is a block diagram of an exemplary computer server, in accordance with some embodiments.

FIG. 10 illustrates a diagram of an example server 1015 (such as the processing server 115 as discussed with respect to FIG. 1) in which the functionalities as discussed herein may be implemented. It should be appreciated that the server 1015 may be configured to be connect to and communicate with various entities, components, and devices, as discussed herein.

The server 1015 may include a processor 1072 as well as a memory 1078. The memory 1078 may store an operating system 1079 capable of facilitating the functionalities as discussed herein as well as a set of applications 1075 (i.e., machine readable instructions). For example, one of the set of applications 1075 may be an image training application 1090 configured to train image models for use in subsequent image analysis, and an image analysis application 1091 configured to analyze images using image models. It should be appreciated that one or more other applications 1092 are envisioned.

The processor 1072 may interface with the memory 1078 to execute the operating system 1079 and the set of applications 1075. According to some embodiments, the memory 1078 may also include image model data 1080 that the image analysis application 1091 may access and utilize in image analyses. The memory 1078 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The server 1015 may further include a communication module 1077 configured to communicate data via one or more networks 1010. According to some embodiments, the communication module 1077 may include one or more transceivers (e.g., WWAN, WLAN, and/or WPAN transceivers) functioning in accordance with IEEE standards, 3GPP standards, or other standards, and configured to receive and transmit data via one or more external ports 1076. For example, the communication module 1077 may receive, via the network 1010, digital image data captured by a set of components (e.g., aerial vehicles such as UAVs). For further example, the communication module 1077 may transmit notifications and communications to electronic devices associated with customers.

The server 1015 may further include a user interface 1081 configured to present information to a user and/or receive inputs from the user. As shown in FIG. 10, the user interface 1081 may include a display screen 1082 and I/O components 1083 (e.g., ports, capacitive or resistive touch sensitive input panels, keys, buttons, lights, LEDs, speakers, microphones). According to some embodiments, the user may access the server 1015 via the user interface 1081 to review information and/or perform other functionalities. In some embodiments, the server 1015 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processor 1072 (e.g., working in connection with the operating system 1079) to facilitate the functions as described herein. In this regard, the program code may be implemented in any desired language, and may be implemented as machine code, assembly code, byte code, interpretable source code or the like (e.g., via C, C++, Java, Actionscript, Objective-C, Javascript, CSS, XML). In some embodiments, the computer program product may be part of a cloud network of resources.

Embodiments of the techniques described in the present disclosure may include any number of the following aspects, either alone or combination:

1. A computer-implemented method in a processing server of analyzing image data to automatically assess hail damage to a property, the method comprising: accessing digital image data depicting a roof of the property; segmenting, by a processor, the digital image data into a set of digital images depicting a respective set of portions of the roof of the property; analyzing, by the processor using a convolutional neural network (CNN), the set of digital images to identify a set of regions of potential hail damage; extracting, by the processor, a set of features from each of the set of regions of potential hail damage; and analyzing, by the processor, the set of features using a classification model to generate a set of outputs indicating a presence of hail damage in the set of digital images.

2. The computer-implemented method of claim 1, wherein segmenting the digital image data into the set of digital images comprises: segmenting the digital image data into the set of digital images using a sliding window technique.

3. The computer-implemented method of either of claim 1 or claim 2, further comprising: training the convolutional neural network (CNN) using a set of training data comprising a set of training images and a set of training labels.

4. The computer-implemented method of any of claims 1-3, wherein analyzing the set of features using the classification model comprises: analyzing, by the processor, the set of features using the classification module to generate a set of binary outputs respectively indicating whether hail damage is present in the set of features.

5. The computer-implemented method of any of claims 1-4, further comprising: calculating, by the processor based on the set of outputs, an estimated damage amount to the roof of the property.

6. The computer-implemented method of any of claims 1-5, wherein extracting the set of features from each of the set of regions of potential hail damage comprises: extracting, by the processor from each of the set of regions, at least one of a set of texture features, a set of color features, and a set of shape features.

7. The computer-implemented method of any of claims 1-6, wherein analyzing the set of features using the classification model comprises: inputting, by the processor, each of the set of features into the classification model; and after inputting each of the set of features into the classification model, generating the set of outputs, each of which comprises a confidence level indicating the presence of hail damage in the set of digital images.

8. A system for analyzing image data to automatically assess hail damage to a property, comprising: a memory configured to store non-transitory computer executable instructions; and a processor interfacing with the memory, and configured to execute the non-transitory computer executable instructions to cause the processor to: access digital image data depicting a roof of the property, segment the digital image data into a set of digital images depicting a respective set of portions of the roof of the property, analyze, using a convolutional neural network (CNN), the set of digital images to identify a set of regions of potential hail damage, extract a set of features from each of the set of regions of potential hail damage, and analyze the set of features using a classification model to generate a set of outputs indicating a presence of hail damage in the set of digital images.

9. The system of claim 8, wherein to segment the digital image data into the set of digital images, the processor is configured to: segment the digital image data into the set of digital images using a sliding window technique.

10. The system of either of claim 8 or claim 9, wherein the processor is further configured to: train the convolutional neural network (CNN) using a set of training data comprising a set of training images and a set of training labels; and store, in the memory, the CNN that was trained.

11. The system of any of claims 8-10, wherein to analyze the set of features using the classification model, the processor is configured to: analyze the set of features using the classification module to generate a set of binary outputs respectively indicating whether hail damage is present in the set of features.

12. The system of any of claims 8-11, wherein the processor is further configured to: calculate, based on the set of outputs, an estimated damage amount to the roof of the property.

13. The system of any of claims 8-12, wherein to extract the set of features from each of the set of regions of potential hail damage, the processor is configured to: extract, from each of the set of regions, at least one of a set of texture features, a set of color features, and a set of shape features.

14. The system of any of claims 8-13, wherein to analyze the set of features using the classification model, the processor is configured to: input each of the set of features into the classification model, and after inputting each of the set of features into the classification model, generate the set of outputs, each of which comprises a confidence level indicating the presence of hail damage in the set of digital images.

15. A non-transitory computer-readable storage medium configured to store instructions, the instructions when executed by a processor causing the processor to perform operations comprising: accessing digital image data depicting a roof of a property; segmenting the digital image data into a set of digital images depicting a respective set of portions of the roof of the property; analyzing, using a convolutional neural network (CNN), the set of digital images to identify a set of regions of potential hail damage; extracting a set of features from each of the set of regions of potential hail damage; and analyzing the set of features using a classification model to generate a set of outputs indicating a presence of hail damage in the set of digital images.

16. The non-transitory computer-readable storage medium of claim 15, wherein segmenting the digital image data into the set of digital images comprises: segmenting the digital image data into the set of digital images using a sliding window technique.

17. The non-transitory computer-readable storage medium of either of claim 15 or claim 16, wherein analyzing the set of features using the classification model comprises: analyzing the set of features using the classification module to generate a set of binary outputs respectively indicating whether hail damage is present in the set of features.

18. The non-transitory computer-readable storage medium of any of claims 15-17, wherein extracting the set of features from each of the set of regions of potential hail damage comprises: extracting, from each of the set of regions, at least one of a set of texture features, a set of color features, and a set of shape features.

19. The non-transitory computer-readable storage medium of any of claims 15-18, wherein analyzing the set of features using the classification model comprises: inputting each of the set of features into the classification model; and after inputting each of the set of features into the classification model, generating the set of outputs, each of which comprises a confidence level indicating the presence of hail damage in the set of digital images.

20. The non-transitory computer-readable storage medium of any of claims 15-19, wherein the operations further comprise: calculating, based on the set of outputs, an estimated damage amount to the roof of the property.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of analyzing image data to automatically assess hail damage to a property, the method comprising:
    accessing digital image data depicting a roof of the property;
    segmenting, by a processor, the digital image data into a set of digital images depicting portions of the roof;
    identifying, by the processor and using a convolutional neural network (CNN), regions of potential hail damage depicted in the set of digital images;
    identifying, by the processor, features indicative of the potential hail damage and illustrated within the respective regions based at least in part on a numerical proximity of aspect ratios of the features to one, wherein identifying the features comprises:
        determining sections of a digital image from the set of digital images, the sections including a first section within a region of potential hail damage and a second section outside of the region of potential hail damage; and
        identifying a texture feature within the sections by performing a Gray-Level Co-Occurrence Matrices (GLCM) analysis on the sections to output a set of statistical properties comprising one or more of contrast, entropy, energy, or homogeneity for the first section and the second section; and
    generating, by the processor, using a classification model, and based on the features, an output indicating a presence of hail damage associated with the roof, wherein the output is used to automatically determine an estimated damage amount to the roof of the property.

2. The computer-implemented method of claim 1, further comprising:
    training the CNN using training data comprising training images and training labels, wherein the trained CNN is configured to:
        classify the set of digital images based on at least one of the training images and the training labels, and
        generate images depicting the regions of potential hail damage.

3. The computer-implemented method of claim 2, wherein the training images include at least a first image that depicts hail damage and a second image that depicts non-hail damage, and the training labels include data identifying a portion of the first image as a region depicting hail damage and identifying a remaining portion of the first image as depicting non-hail damage, the remaining portion excludes the region depicting hail damage.

4. The computer-implemented method of claim 1, wherein identifying the features further comprises:
    identifying, by the processor within the sections, one or more of a color feature or a shape feature.

5. The computer-implemented method of claim 4, wherein identifying the color feature comprises:
    generating, by the processor, histograms that represent colors depicted within the sections of the digital image; wherein the histograms are associated with statistics including one or more of a color mean value, a color skewness value, and a color variation value.

6. The computer-implemented method of claim 4, wherein identifying the shape feature comprises:
  determining, by the processor, one or more of an area or a contour curvature of the first section and the second section of the digital image.

7. The computer-implemented method of claim 1, wherein the output comprises a set of binary outputs indicating whether hail damage is present in the features.

8. The computer-implemented method of claim 1, wherein generating the output using the classification model comprises:
  inputting, by the processor, the features into the classification model; and
  assigning a confidence level to the output based on a likelihood of the features indicating the presence of hail damage in the set of digital images.

9. A system for analyzing image data to automatically assess hail damage to a property, comprising:
  a memory configured to store non-transitory computer executable instructions; and
  a processor interfacing with the memory, and configured to execute the non-transitory computer executable instructions to cause the processor to:
    access digital image data depicting a roof of the property;
    segment the digital image data into a set of digital images depicting portions of the roof;
    identify, using a convolutional neural network (CNN), regions of potential hail damage depicted in the set of digital images;
    identify features indicative of the potential hail damage and illustrated within the respective regions based at least in part on a numerical proximity of aspect ratios of the features to one, including by:
      determining sections of a digital image from the set of digital images, the sections including a first section within a region of potential hail damage and a second section outside of the region of potential hail damage; and
      identifying a texture feature within the sections by performing a Gray-Level Co-Occurrence Matrices (GLCM) analysis on the sections to output a set of statistical properties comprising one or more of contrast, entropy, energy, or homogeneity for the first section and the second section; and
    generate, using a classification model, and based on the features, an output indicating a presence of hail damage associated with the roof, wherein the output is used to automatically determine an estimated damage amount to the roof of the property.

10. The system of claim 9, wherein the processor is further configured to:
  train the CNN using a set of training data comprising a set of training images and a set of training labels; and
  store the trained CNN in the memory.

11. The system of claim 9, wherein to generate the output using the classification model, the processor is configured to:
  input the features into the classification model to generate a set of binary outputs respectively indicating whether hail damage is present in the features.

12. The system of claim 9, wherein identifying the features is further based at least in part on determining that the features are associated with a color variation that meets or exceeds a threshold value.

13. The system of claim 9, wherein to identify features indicative of the potential hail damage, the processor is configured to:
  identify, from the respective regions, a set of shape features, wherein a shape feature of the set of shape features includes an area and a contour curvature.

14. The system of claim 9, wherein to generate the output using the classification model, the processor is configured to:
  input the features into the classification model; and
  generate an associated confidence level based on a likelihood of the features indicating the presence of hail damage in the set of digital images.

15. A non-transitory computer-readable storage medium configured to store instructions, the instructions when executed by a processor causing the processor to perform operations comprising:
  accessing digital image data depicting a roof of a property;
  segmenting the digital image data into a set of digital images depicting portions of the roof;
  identifying, using a convolutional neural network (CNN), regions of anomalies depicted in the set of digital images, the regions of anomalies indicating potential hail damage;
  identifying features indicative of the potential hail damage and illustrated within the respective regions based at least in part on a numerical proximity of aspect ratios of the features to one, wherein identifying the features comprises:
    determining sections of a digital image from the set of digital images, the sections including a first section within a region of potential hail damage and a second section outside of the region of potential hail damage; and
    identifying a texture feature within the sections by performing a Gray-Level Co-Occurrence Matrices (GLCM) analysis on the sections to output a set of statistical properties comprising one or more of contrast, entropy, energy, or homogeneity for the first section and the second section; and
  generating, using a classification model and based on the features, an output indicating a presence of hail damage associated with the roof, wherein the output is used to automatically determine an estimated damage amount to the roof of the property.

16. The non-transitory computer-readable storage medium of claim 15, wherein segmenting the digital image data into the set of digital images comprises:
  segmenting the digital image data into the set of digital images using a sliding window technique.

17. The non-transitory computer-readable storage medium of claim 15, wherein generating the output using the classification model comprises:
  analyzing the features using the classification model to generate a set of binary outputs respectively indicating whether hail damage is present in the features.

18. The non-transitory computer-readable storage medium of claim 15, wherein identifying the features comprises:
  identifying, within individual sections of the sections, at least one of a set of color features or a set of shape features.

19. The non-transitory computer-readable storage medium of claim 15, wherein generating the output using the classification model comprises:
  inputting the features into the classification model; and generating an associated confidence level based on a
likelihood of the features indicating actual hail damage.

20. The non-transitory computer-readable storage medium of claim 15, wherein identifying the features within sections of the set of digital images is further based at least in part on determining that the features are associated with a color variation that meets or exceeds a threshold value.

* * * * *